United States Patent
Park et al.

(10) Patent No.: US 11,080,895 B2
(45) Date of Patent: Aug. 3, 2021

(54) GENERATING SIMULATED BODY PARTS FOR IMAGES

(71) Applicant: International Business Machines Corporation, Armonk, NY (US)

(72) Inventors: Sun Young Park, San Diego, CA (US); Dusty Sargent, San Diego, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 232 days.

(21) Appl. No.: 16/175,592

(22) Filed: Oct. 30, 2018

(65) Prior Publication Data
US 2020/0134876 A1 Apr. 30, 2020

(51) Int. Cl.
| G06K 9/00 | (2006.01) |
| G06T 11/00 | (2006.01) |
| G06K 9/62 | (2006.01) |
| G06N 3/08 | (2006.01) |
| G06N 3/04 | (2006.01) |

(52) U.S. Cl.
CPC .......... *G06T 11/00* (2013.01); *G06K 9/00362* (2013.01); *G06K 9/6256* (2013.01); *G06N 3/088* (2013.01); *G06K 9/628* (2013.01); *G06K 9/6262* (2013.01); *G06K 2209/05* (2013.01); *G06N 3/04* (2013.01); *G06N 3/0445* (2013.01); *G06N 3/0454* (2013.01); *G06T 2210/41* (2013.01)

(58) Field of Classification Search
CPC ............. G06K 9/00362; G06K 9/6256; G06K 9/6262; G06K 2209/05; G06K 9/628; G06K 2209/051; G06T 11/00; G06T 2210/41; G06N 3/088; G06N 3/0454; G06N 3/0445; G06N 3/04
See application file for complete search history.

(56) References Cited

U.S. PATENT DOCUMENTS

| 6,915,005 | B1 * | 7/2005 | Ruchala ................... A61B 6/08 382/131 |
| 9,235,907 | B2 | 1/2016 | Ramirez Giraldo et al. |
| 9,332,953 | B2 | 5/2016 | Suzuki |
| 9,785,858 | B2 | 10/2017 | Seifert et al. |
| 2010/0080434 | A1 | 4/2010 | Seifert et al. |
| 2015/0201895 | A1 | 7/2015 | Suzuki |
| 2017/0372193 | A1 | 12/2017 | Mailhe et al. |
| 2018/0060652 | A1 * | 3/2018 | Zhang ...................... G06K 9/46 |
| 2019/0035075 | A1 * | 1/2019 | Middlebrooks ........ G06T 7/0012 |
| 2019/0035118 | A1 * | 1/2019 | Zhao ...................... G06T 3/4076 |
| 2019/0197368 | A1 * | 6/2019 | Madani ................... G06K 9/627 |

(Continued)

*Primary Examiner* — Syed Haider
(74) *Attorney, Agent, or Firm* — Fabian VanCott; Steven L. Nichols

(57) ABSTRACT

A system for generating simulated body parts for images may include a body part recognition convolutional neural network (CNN) to recognize a body part in an input image. The body part recognition CNN may be trained using first training data including training images including body parts contained in the input image being identified. The system may also include a body part generative adversarial network (GAN) to complete an image of the body part in the input image based on a body part identification output by the body part recognition CNN. The body part GAN may be trained using second training data including at least partial training images.

18 Claims, 9 Drawing Sheets

(56) References Cited

U.S. PATENT DOCUMENTS

2019/0333219 A1* 10/2019 Xu .................... G06T 7/0014
2020/0020435 A1*  1/2020 Annavi ................ G16H 30/40
2020/0129784 A1*  4/2020 Beriault .............. A61N 5/1049

* cited by examiner

GENERATING SIMULATED BODY PARTS FOR IMAGES

BACKGROUND

The present invention relates to medical imaging, and more specifically, processing of images to produce an augmented image that includes missing anatomical regions missing from a partial, input image.

SUMMARY

According to an embodiment of the present invention, a system for generating simulated body parts for images may include a body part recognition convolutional neural network (CNN) to recognize a body part in an input image. The body part recognition CNN may be trained using first training data including training images including body parts contained in the input image being identified. The system may also include a body part generative adversarial network (GAN) to complete an image of the body part in the input image based on a body part identification output by the body part recognition CNN. The body part GAN may be trained using second training data including at least partial training images. The system may also include a contrast GAN trained to simulate a contrast level in an image based on images taken without a radiocontrast agent present. The system may also include a non-contrast GAN trained to simulate non-contrast images based on images taken with a radiocontrast agent present.

Further, according to an embodiment of the present invention a method of augmenting a computed tomography (CT) image may include training a body part recognition convolutional neural network (CNN) to identify a body part in an input CT image using first training data including CT images including body parts contained in the input CT image being identified. The method may also include, with a body part sequence recurrent neural network (RNN), processing a series of images output by the body part recognition CNN in sequence to refine the identification of the body part output by the body part recognition CNN. Further, the method may include training a first generative adversarial network (GAN) to complete an image of a body part in a partial CT image based on body part identification output by the trained CNN using training data including partial and complete CT images. The method may also include, with a contrast GAN trained with a third database, simulating a contrast level in a CT image based on CT images taken without a radiocontrast agent present, the third database comprising the CT images taken without a radiocontrast agent present. The method may also include, with a non-contrast GAN trained with a fourth database, simulating a contrast level in a CT image based on CT images taken with a radiocontrast agent present, the fourth database comprising the CT images taken with a radiocontrast agent present Further, according to an embodiment of the present invention, a computer program product for augmenting a computed tomography (CT) image may include a computer readable storage medium including computer usable program code embodied therewith. The computer usable program code may, when executed by a processor recognize at least one body part in an input CT image. The input CT image may include a partially captured image of a portion of the body including the at least one body part. The computer usable program code may, when executed by the processor, complete the input CT image based on the recognition of body parts shown to generate a complete CT image. The computer usable program code may, when executed by the processor, simulate a contrast level in a CT image based on previously captured CT images taken with and without a radiocontrast agent present.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
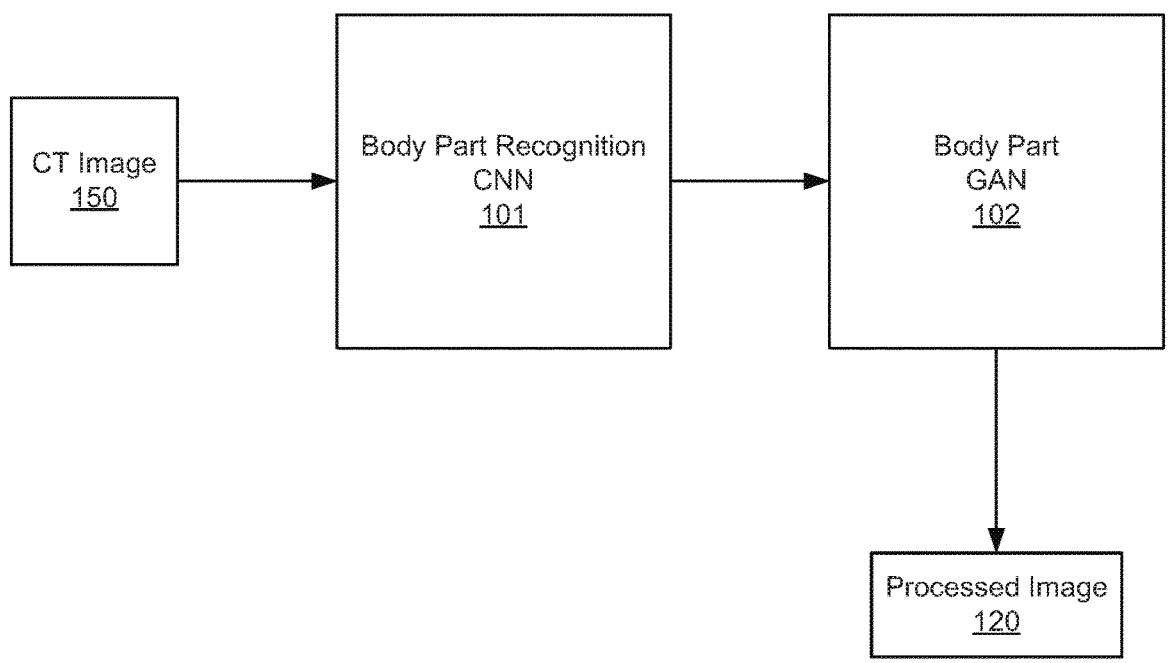
FIG. 1 is a block diagram of a system for generating simulated body parts for computed tomography (CT) images, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention relates to medical imaging such as computed tomography (CT) imaging, positron emission tomography (PET) imaging, magnetic resonance (MR) imaging, cone beam computed tomography (CBCT) imaging, other types of radiography processes or medical imaging processes, and combinations thereof. Medical imaging may be any technique or process of creating visual representations of the interior of a body for clinical analysis and medical intervention, as well as visual representation of the function of some physiology of the body such as organs or tissues. Medical imaging seeks to reveal internal structures hidden by the skin and bones, as well as to diagnose and treat disease and identify abnormalities. Although CT imaging is described herein as an example of a medical imaging processes to which the processes and devices may be used, any type of medical imaging may benefit from the processes described herein.

The present invention relates to, more specifically, processing of medical images to produce an augmented image that includes missing anatomical regions missing from a partial, input image. CT imaging and other types of medical imaging have revolutionized the medical industry by providing a comprehensive and detailed image of the human body by producing data that may be manipulated in order to demonstrate various bodily structures such as internal organs based on those bodily structures' ability to absorb electromagnetic radiation such as X-rays with a wavelength ranging from 0.01 to 10 nanometers corresponding to frequencies in the range 30 petahertz to 30 exahertz ($3 \times 10^{16}$ Hz to $3 \times 10^{19}$ Hz) and energies in the range of between 100 eV and 100 keV. CT imaging makes use of computer-processed combinations of many X-ray measurements taken from different angles to produce cross-sectional, tomographic images to create virtual "slices" of specific areas of a scanned object such as a human's bodily structure, allowing the user to see inside the object without cutting.

CT scanning and other types of medical imaging are relatively safe for humans, and are especially effective in increasing a person's medical outcome given the advantages over any adverse effects. First, CT scans completely eliminate the superimposition of images of structures outside the area of interest making it possible to isolate a desired area of interest in the human body. Second, because of the inherent high-contrast resolution of CT scans, differences between tissues that differ in physical density by less than 1% may be distinguished. This improves a medical practitioner's ability to identify specific tissues under examination. Third, data from a single CT imaging procedure including either multiple contiguous or one helical scan may be viewed using multiplanar reformatted imaging processes where the data captured by the CT scanning device may be viewed as images in the axial, coronal, or sagittal planes, depending on the diagnostic task.

However, even with these advantages that greatly benefit the health of the patient, CT scanning does produce adverse effects to a patient being scanned. The radiation used in CT scans may damage body cells, including deoxyribonucleic acid (DNA) molecules, which may lead to cancer. Further, in the United States half of CT scans are contrast CTs that use intravenously injected radiocontrast agents with human reactions that may be mild, including nausea, vomiting and an itching rash, but instances of more severe reactions may also occur.

With all of this information, when a patient undergoes a CT examination, the patient may be subjected to multiple scans that may be acquired before and after the injection of the radiocontrast agent. These multiple scans increase the time taken for the examination and is uncomfortable for the patient. Further, the increased time within the CT scanning device and subjection to multiple radiation doses increases the patient's risk for cancer. Furthermore, the data produced by the separate scans may be inconsistent as the patient's body may not be exactly aligned between the scans, and different contrast doses and reactions may lead to varying intensity levels in the final images. Likewise, the extent of anatomical coverage may differ between scans. Still further, not all patients are eligible to receive contrast injections due to various health conditions. Thus, a different method of analyzing and creating images based on as few scans of the CT imaging device may prove healthier for the patient and may produce better images.

As used in the present specification and in the appended claims, the term "medical imaging" is meant to be understood broadly as any technique or process of creating visual representations of the interior of a body for clinical analysis and medical intervention, as well as visual representation of the function of some physiology of the body such as organs or tissues. Although CT imaging is used primarily as the example type of medical imaging herein, medical imaging may include any other type of medical imaging including, for example, positron emission tomography (PET) imaging, magnetic resonance (MR) imaging, cone beam computed tomography (CBCT) imaging, other types of radiography processes or medical imaging processes, and combinations thereof.

Turning now to the figures, FIG. 1 is a block diagram of a system (100) for generating simulated body parts for computed tomography (CT) images, according to an example of the principles described herein. The system (100) may include a body part recognition convolutional neural network (CNN) (101) to recognize a body part in an input CT image (150). Artificial neural networks, sometimes referred to as neuromorphic and synaptronic computation systems, are computational systems that permit electronic systems to function in a manner analogous to that of biological brains. A neural network does not utilize the traditional digital model of manipulating 0s and 1s, but, instead, creates connections between processing elements that are roughly functionally equivalent to neurons of a biological brain. A neural network may include various electronic circuits that are modeled on biological neurons. In a neural network, hardware and software serve as neurons that have a given activation function that operates on the inputs. By determining proper connection weights (a process also referred to as "training"), a neural network achieves efficient recognition of a desired patterns, such as images and characters within a set of input data. In an example, these neurons may be grouped into "layers" in order to make connections between groups more obvious and to each computation of values. Training the neural network is a computationally intense process.

The use of neural networks, particularly with convolutional layers, has driven progress in deep learning. Such neural networks are referred to as convolutional neural networks (CNN). In a CNN, kernels convolute overlapping regions in a visual field, and accordingly emphasize the importance of spatial locality in feature detection. The CNN described herein utilize deep learning techniques. Deep learning techniques are widely used in machine-based pattern recognition problems, such as image recognition including the recognition of body parts within CT images. Deep learning inherently leverages the availability of massive training datasets (that are enhanced with the use of Big Data) and compute power (that is expected to grow according to Moore's Law).

The body part recognition CNN (101) may be trained using first training data including training CT images. The training CT images include body parts contained in the input CT image being identified in order to allow the CNN (101) to identify the body parts within, for example, the human body. Body parts as described herein include macro- and micro-level recognition or identification of body parts including identification and recognition of the head, neck, chest, abdomen, arms, legs, etc., as well as individual organs within each of these regions of the body and portions of each of the organs.

The body part recognition CNN (101) may be used to identify or recognize body parts within the input CT image (150) in order to know what body parts are included within the input CT image (150) and what body parts are missing from the input CT image (150). In many instances, medical practitioners may desire to capture only a portion of a patient's body in order to reduce the time the patient is exposed to harmful x-rays and reduce the time the patient experiences the discomfort of being placed within a CT imaging device. Thus, a CT scan may be performed that images one or a few body parts, and the body part recognition CNN (101) determines what body parts are included in the input CT image (150). The body part recognition CNN (101) processes a 2D slice or 3D volume image that is a cross sectional image of a portion of a patient's body, and recognizes or identifies from what part of the body that input CT image (150) came from.

Figure 4:
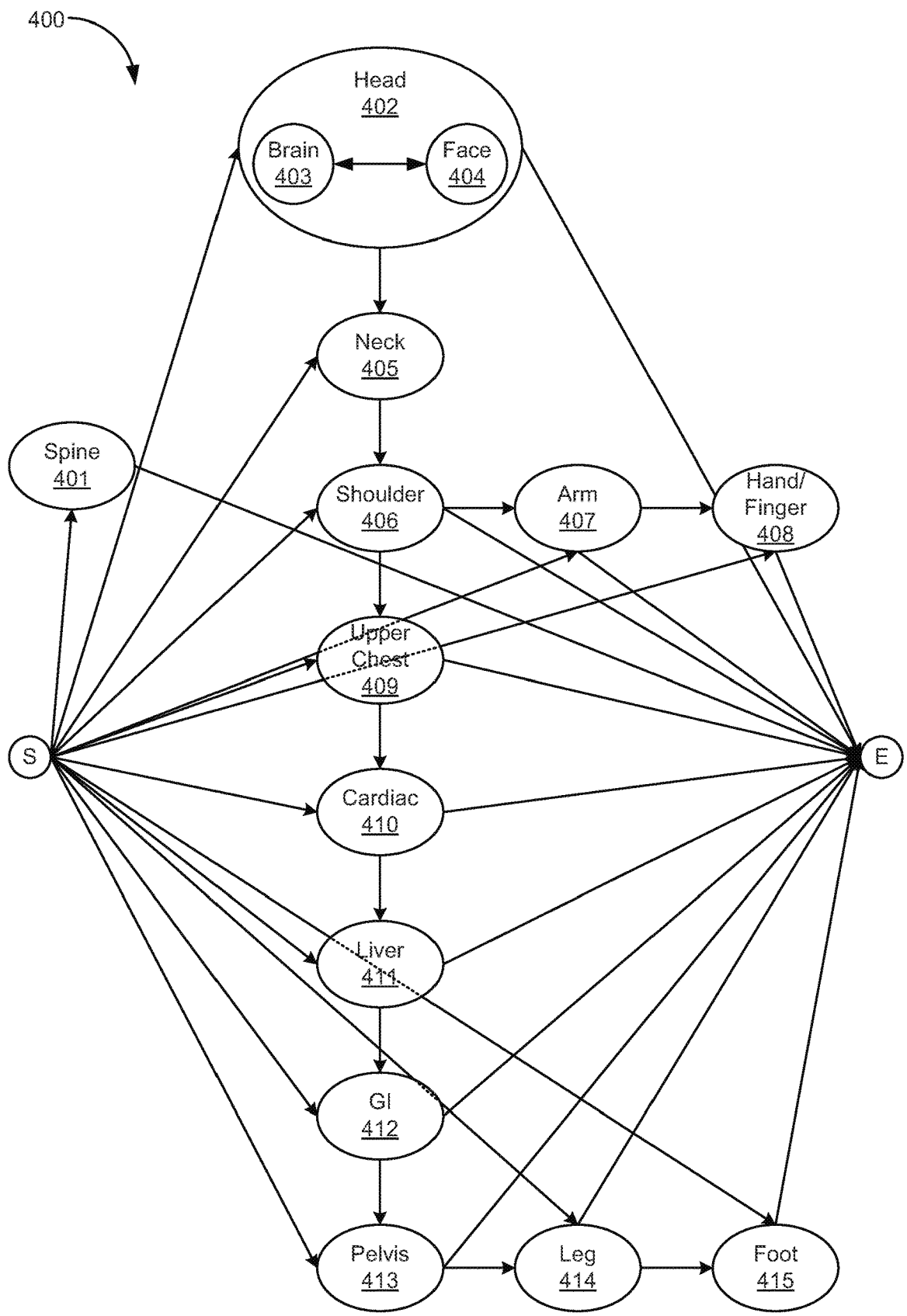
FIG. 4 is a block diagram of a classification diagram used by a body part recognition convolutional neural network (CNN) and a body part sequence recurrent neural network (RNN) to classify body parts within an input CT image, according to an example of the principles described herein.

The body part recognition CNN (101) then classifies that input CT image (150) into a category of body regions or parts. FIG. 4 is a block diagram of a classification diagram (400) used by the body part recognition CNN (101) and a body part sequence recurrent neural network (RNN) (103) described hereafter to classify body parts within the input CT image (150), according to an example of the principles described herein. The "S" and "E" in FIG. 4 indicate the start and end of the classification diagram, respectively. The classification diagram (400) of FIG. 4 includes a number of body parts including the spine (401), the head (402) including the brain (403) and face (404), the neck region (405), the shoulder region (406) leading to the arm regions (407) and the hand and fingers regions (408), the upper chest (409), the cardiac region (410), the liver region (411), the gastrointestinal tract region (412), and the pelvis region (413) leading to the legs (414) and feet (415). The body part recognition CNN (101) classifies or categorizes the input CT image (150) into one of the categories provided in the classification diagram (400) based on the body parts recognized in the input CT image (150).

The system (100) of FIG. 1 also includes a body part generative adversarial network (GAN) (102). A GAN is a class of artificial intelligence hardware and software used in unsupervised machine learning, implemented by a system of two neural networks contesting with each other in a zero-sum game framework; a generator and a discriminator. The objective of the body part GAN (102) is to fill in missing parts of the input CT image (150) with body parts from a database of previously obtained body part images that are captured from previous patients. The body part GAN (102) creates an augmented CT image that includes the input CT image (150) and the inserted body parts to produce a larger, augmented CT image that is not distinguishable by a human as having been patched together from the input CT image (150) and other previously obtained body part images. The input CT image (150) may be a partial CT image that includes the head region (402), neck region (405), and GI region (412), but not the upper chest region (409), cardiac region (410), and liver region (411). In this example, the body part GAN (102) may be used to augment the input CT image to include an upper chest region (409), cardiac region (410), and liver region (411) to create a more complete, augmented CT image. The labeling of the different categories may be coarse-grained labling such that larger and fewer regions of the body are individually classified. In another example, the labeling of the different categories may be relatively finer-grained such that smaller and more regions of the body are individually classified.

Thus, the body part GAN (102) includes a first neural network referred to as a generator to generate the augmented CT image from the input CT image (150) and the previously obtained body part images. The generator may be trained based on body part regions (FIG. 4, 401 through 415, collectively referred to herein as 420), and may acquire previously obtained body part images from a database of previously obtained body part images to create a simulated body part within the input CT image (150) to fill in the missing parts within the input CT image (150). Thus, the generator of the body part GAN (102) seeks to create simulated body part images that are convincing enough that the filed-in portions of the augmented CT image are indistinguishable from authentic body scan images.

The discriminator of the body part GAN (102) seeks to discriminate between instances from the true data distribution such as the input CT image (150) and candidates produced by the generator such as those missing body parts filled in by the generator. The generative network's training objective is to increase the error rate of the discriminative network in order to "fool" the discriminator into believing the augmented CT image is real by producing novel, synthesized instances that appear to have come from the true data distribution or are real CT images that look as if the entirety of the patient including those regions identified in the input CT image (150) and the filled-in portions are a single, real CT image. A number of iterations may be made between the generator generating better and better versions of the augmented CT image and the discriminator discriminating between real and fake portions of the augmented CT image until the discriminator can no longer distinguish the real portions of the augmented CT image from the fake portions. In an example, training of the body part GAN (102) proceeds in the competitive dual optimization scheme, where the generator synthesizes images from random noise input. Training for each body region may conclude when the discriminator is no longer able to distinguish real from fake images. A processed image (120) including the original input CT image (150) and segmented portions of CT imagery is the output of the system (100). The processed image (120) includes the original input CT image (150) and at least one other portion of the body as simulated by the body part GAN (102). This processed image (120) allows for fewer images to be taken by a CT imaging device of the patient while still providing a more inclusive or complete CT image.

In one example, the generator may be designed to directly create three-dimensional (3D) images from a series or sequence of input CT images for each body region. In another example, recurrent GAN may be used to produce sequences of two-dimensional (2D) images similar to the manner in which the RNN is utilized for body part recognition as described herein. Thus, a user such as a medical practitioner may obtain either 2D or 3D CT images using the principles and methods described herein. More details regarding the system (100) are described herein in connection with FIGS. 2, 3, and 5

Figure 2:
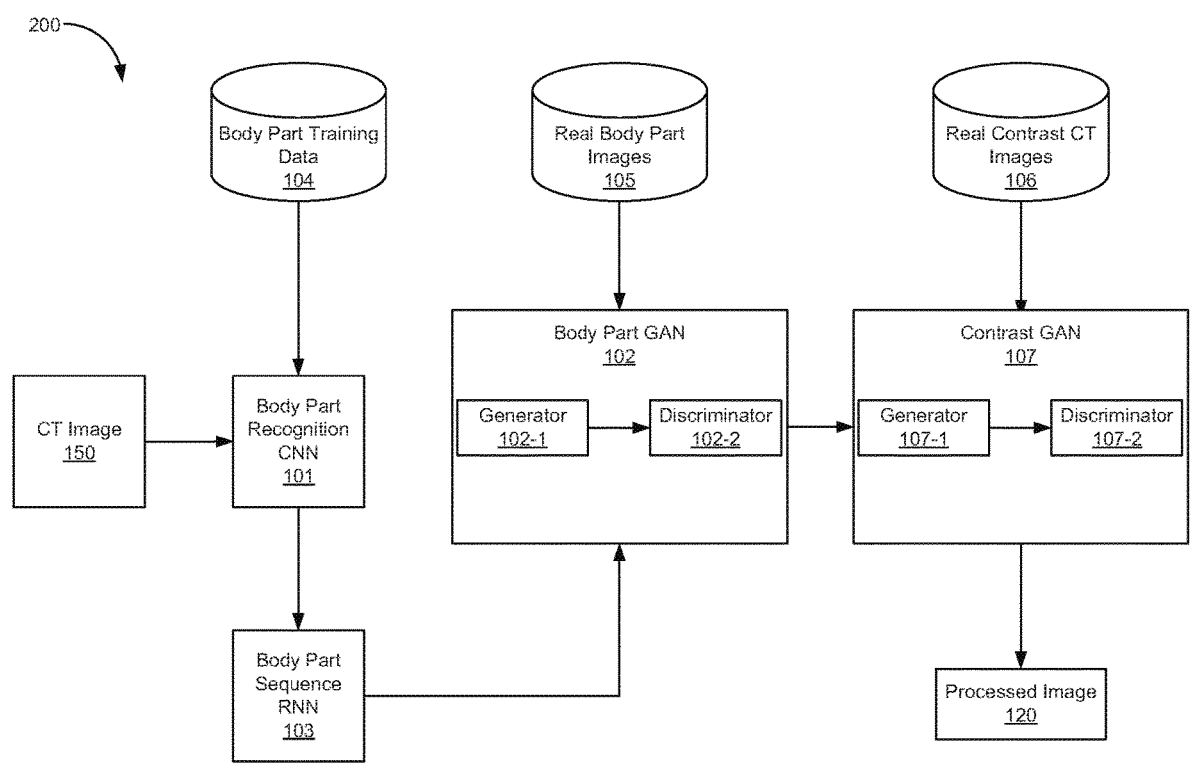
FIG. 2 is a block diagram of a system for generating simulated body parts for computed tomography (CT) images, according to an example of the principles described herein.

FIG. 2 is a block diagram of a system (200) for generating simulated body parts for CT images, according to an example of the principles described herein. The system (200) of FIG. 2 includes the body part recognition CNN (101) and body part GAN (102) of FIG. 1, and their description is provided herein in connection with FIG. 1. The body part GAN (102), as described, includes a first generator (102-1) to create simulated body part images such that the filled-in partial scans are indistinguishable from authentic full body scans and a first discriminator (102-2) to distinguish real CT images of each body region from fakes in order to force the first generator (102-1) to create better simulated body part images.

The system (200) of FIG. 2 may also include a body part sequence recurrent neural network (RNN) (103). The body part sequence RNN (103) refines identification of the body part output by the body part recognition CNN (101) by processing a series of images output by the body part recognition CNN (101) in sequence. The body part recognition CNN (101) analyzes individual input CT images (150). These individual input CT images (150) may include 2D cross-sectional images. A CT imaging device makes use of computer-processed combinations of many X-ray measurements taken from different angles to produce cross-sectional, tomographic images or virtual "slices" of specific areas or regions of the patient's body allowing the user such as a practitioner to see inside the object without cutting the patient's body. These tomographic images may be fed to the body part recognition CNN (101) for identification and classification. Because the tomographic CT images of a patient are usually captured as a series or sequence of images along a length of a target body part, the body part sequence RNN (103) then takes the CT images (150) output from the body part recognition CNN (101) and analyzes them in a sequential order. As the body part sequence RNN (103) analyzes the series of CT images (150), the body part sequence RNN (103) is determining if a CT image within the series is out of place or is not an expected next image in the series of images. In the 2D, cross-sectional, tomographic CT images, some body regions may occasionally appear similar. For example, certain slices in the shoulder region (406) may sometimes appear similar to certain slices in the pelvis region (413). Additionally, there are constraints on the sequence of body parts appearing in an axial image series while moving along the superior-inferior axis since a human body has a general order of placement of body parts along its length such as, for example, the fact that a patient's cardiac region (410) comes between his or her upper chest region (409) and pelvis region (413. For this reason, the body part sequence RNN (103) refines the body part classifications produced by the body part recognition CNN (101) by processing the entire CT image series as a sequence as opposed to processing each 2D image independently. The body part sequence RNN (103) is trained on ordered sequences of body part-labeled 2D images, and is used to correct any ordering errors arising from analysis performed by the body part recognition CNN (101).

The body part recognition CNN (101) and the body part sequence RNN (103) may be trained using data from a database of body part training data (104). The body part training data (104) includes previously capture CT images of other individuals' body parts that have been correctly identified and classified as containing particular body parts. This body part training data (104) may be relied upon by the body part recognition CNN (101) and the body part sequence RNN (103) to understand what body parts are within each input CT image and series of CT images, and classify those CT images appropriately. The output of the body part sequence RNN (103) is sent to the body part GAN (102) for further processing.

With respect to the body part GAN (102), a database of real body part images (105) may be used by the body part GAN (102) to fill in missing portions of the CT images or the series of CT images. The real body part images (105) are CT images taken by a CT imaging device of other individuals' body parts. It is these body parts that are used by the first generator (102-1) to patch or fill in the any portions of the input CT images (150) captured.

The system (200) may also include at least one contrast GAN (107). The contrast GAN (107) generates various levels of contrast and non-contrast data using unpaired training images of varying contrast levels. A second generator (107-1) creates simulated contrast images that are iteratively analyzed by the second discriminator (107-2) until the output of the second generator (107-1) cannot be distinguished from authentic contrast images by the second discriminator (107-2).

The pixels in the CT images described herein are measured in Hounsfield units, which is a quantitative scale for describing radiodensity of different materials and which has different defined ranges for different materials. For example, human body fat ranges from −120 to −90 HU, and soft tissue ranges from 100 to 300 HU. Further, in some examples, the individual being imaged may be provided a radiocontrast agent to assist in distinguishing different materials or tissues in his or her body. The application of a radiocontrast agent causes the HU values to increase in different ways for different types of tissue.

The contrast GAN (107) may be trained to generate various levels of contrast-enhanced images from input non-contrast images, and various non-contrast-enhanced images from input contrast images. The contrast GAN (107) is trained using a database of real contrast CT images (106) that include CT images taken of other individuals' body parts at various contrast levels and with and without a radiocontrast agent. The contrast GAN (107) simulates contrast level X from contrast and non-contrast inputs. The contrast GAN (107) is trained using a set of authentic images of the desired contrast level obtained from the database of real contrast CT images (106), and training completes when the second generator (107-1) produces or selects a contrast level, and its associated second discriminator (107-2) cannot tell the real and fake images apart after a number of iterations between the second generator (107-1) generating better and better versions of the contrast-adjusted CT image and the second discriminator (107-2) discriminating between real and fake portions of the contrast-adjusted CT image until the second discriminator (107-2) can no longer distinguish the real portions of the augmented CT image from the fake portions. In this manner, the contrast of an augmented CT image obtained from the body part GAN (102) may be adjusted to make desired portions of the imaged body to be seen more clearly.

Figure 3:
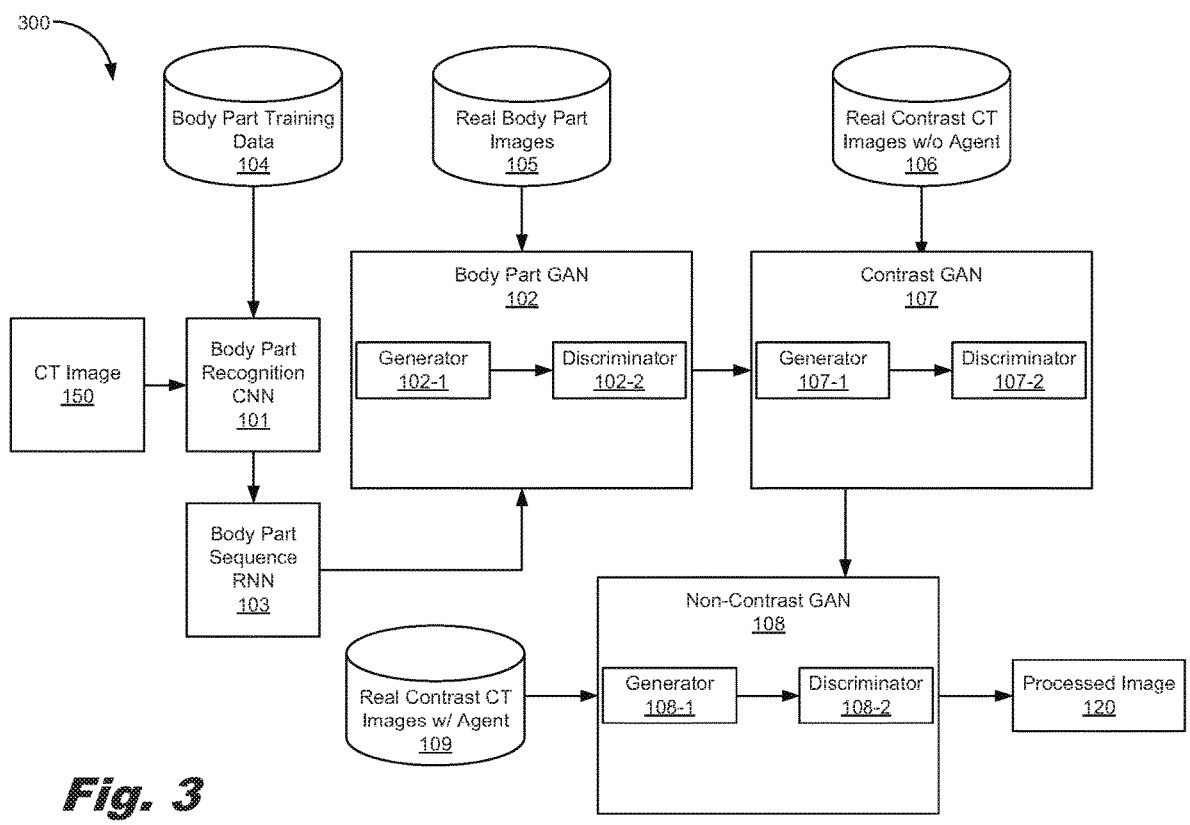
FIG. 3 is a block diagram of a system for generating simulated body parts for computed tomography (CT) images, according to an example of the principles described herein.

FIG. 3 is a block diagram of a system (300) for generating simulated body parts for computed tomography (CT) images, according to an example of the principles described herein. The system (300) may include all those elements described herein in connection with the systems (100, 200) of FIGS. 1 and 2. In addition, the system (300) of FIG. 3 includes a second contrast-adjusting GAN (108) with its respective third generator (108-1) and third discriminator (108-2). Thus, the system (300) of FIG. 3 includes a contrast GAN (107) and a non-contrast GAN (108). The contrast GAN (107) is trained using real contrast CT images (106) that include CT images taken of other individuals' body parts at various contrast levels and without a radiocontrast agent present in the individuals' bodies. The non-contrast GAN (108), however, is trained using real contrast CT images (106) that include CT images taken of other individuals' body parts at various contrast levels and with a radiocontrast agent present in the individuals' bodies. Thus, in this manner, the system (300) is able to obtain various levels of contrast in the processed image (120).

Therefore, in the example of FIG. 3, the contrast-adjusting GANs (107, 108) may divide the range of contrast doses into different levels, and, in one example, trains the two contrast-adjusting GANs (107, 108) for each level. The first, contrast GAN (107) simulates contrast level X from non-contrast input, and the second, non-contrast GAN (108) simulates non-contrast images from an input of contrast level Y. Each contrast-adjusting GAN (107, 108) is trained using a set of authentic images of the desired contrast level, and training completes when the second generator (107-1) and the third generator (108-1) produces or selects a contrast level, and its associated and respective second discriminator (107-2) and third discriminator (108-2) cannot tell the real and fake images apart after a number of iterations between the second generator (107-1) and the third generator (108-1) generating better and better versions of the contrast-adjusted CT image and the second discriminator (107-2) and third discriminator (108-2) discriminating between real and fake portions of the contrast-adjusted CT image until the second discriminator (107-2) and third discriminator (108-2) can no longer distinguish the real portions of the augmented CT image from the fake portions.

As opposed to the body part GAN (102) the contrast-adjusting GANs (107, 108) may be seeded with input images rather than random noise. For example, the contrast-adjusting GANs (107, 108) creating contrast images may be seeded with non-contrast images, and produce the corresponding contrast images of the same anatomy. After training, the system (300) is applied to a new image series by first running body part recognition using the body part recognition CNN (101) and the body part sequence RNN (103) to determine the body parts contained in the images, and filling in missing anatomy using the body part GAN (102) to obtain a full scan. The system (300) may also simulate a desired contrast by applying the contrast-adjusting GANs (107, 108) to the full body image to simulate an appropriate or effective contrast level within the full body image to produce a processed image (120) that a user such as a medical practitioner may use to provide a medical diagnosis.

Figure 5:
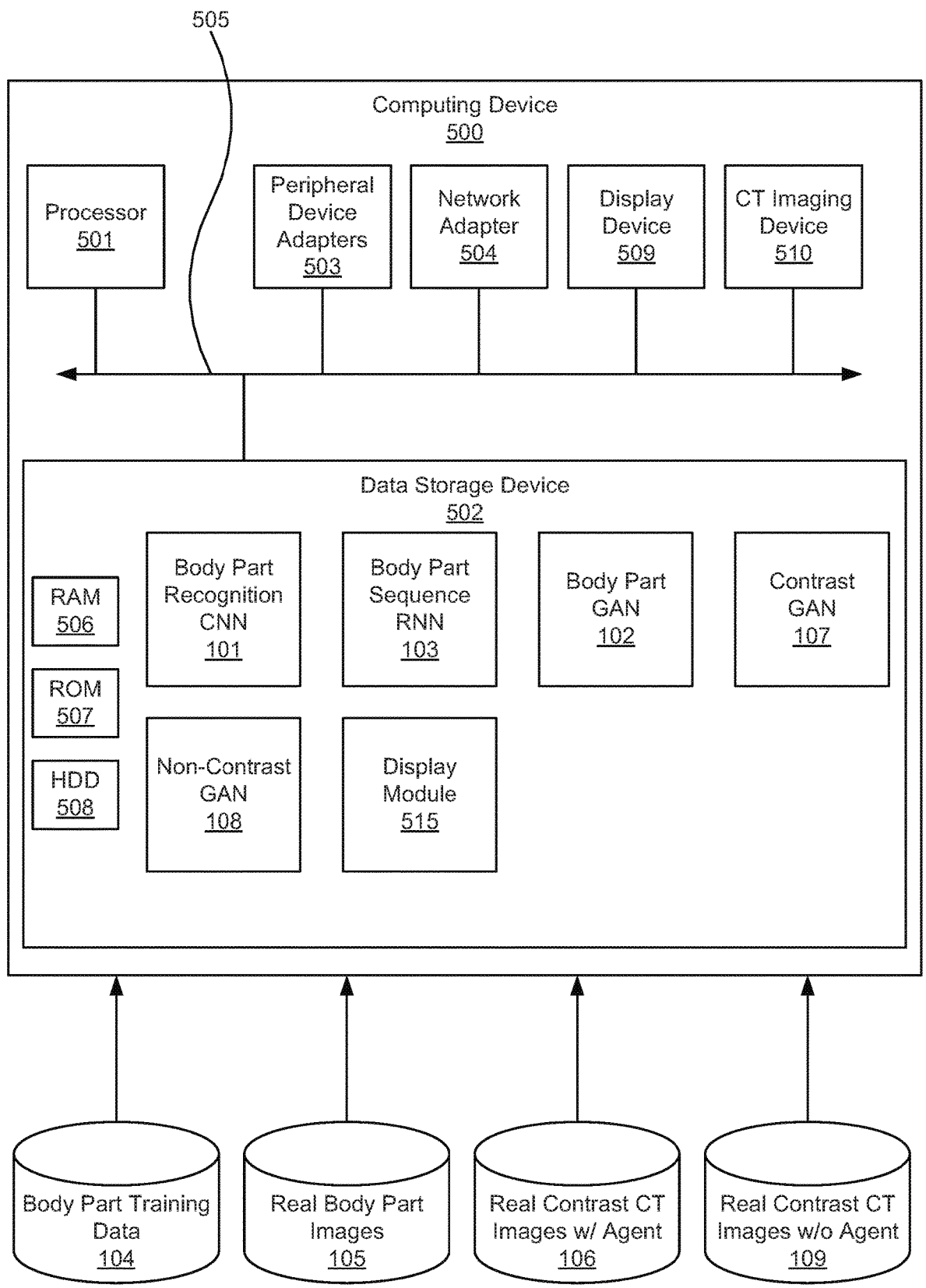
FIG. 5 is a block diagram of a computing device for generating simulated body parts for computed tomography (CT) images, according to an example of the principles described herein.

FIG. 5 is a block diagram of a computing device (500) for generating simulated body parts for computed tomography (CT) images, according to an example of the principles described herein. The computing device (500) may be implemented in an electronic device. Examples of electronic devices include medical imaging devices, servers, desktop computers, laptop computers, personal digital assistants (PDAs), mobile devices, smartphones, gaming systems, tablets, other electronic devices, and combinations thereof.

The computing device (500) may be utilized in any data processing scenario including, stand-alone hardware, mobile applications, through a computing network, or combinations thereof. Further, the computing device (500) may be used in a computing network, a public cloud network, a private cloud network, a hybrid cloud network, other forms of networks, or combinations thereof. In one example, the methods provided by the computing device (500) are provided as a service over a network by, for example, a third party. In this example, the service may include, for example, the following: a Software as a Service (SaaS) hosting a number of applications; a Platform as a Service (PaaS) hosting a computing platform including, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device (500) are executed by a local administrator.

To achieve its desired functionality, the computing device (500) includes various hardware components. Among these hardware components may be a processor (501), a data storage device (502), a peripheral device adapter (503), a network adapter (504), a display device (509), and a CT imaging device (510). These hardware components may be interconnected through the use of a number of busses and/or network connections such as bus (505).

The processor (501) may include the hardware architecture to retrieve executable code from the data storage device (502) and execute the executable code. The executable code may, when executed by the processor (501), cause the processor (501) to implement at least the functionality of training the body part recognition CNN (101) to identify a body part in an input CT image (150) using first training data including CT images including body parts contained in the input CT image being identified, with a body part sequence RNN (103), processing a series of images output by the body part recognition CNN (101) in sequence to refine the identification of the body part output by the body part recognition CNN (101), and training a body part GAN (102) to complete an image of a body part in a partial CT image based on body part identification output by the trained body part recognition CNN (101) using training data including partial and complete CT images, according to the methods of the present specification described herein.

The executable code may also, when executed by the processor (501), cause the processor (501) to implement at least the functionality of training at least a second GAN to simulate a contrast level in a CT image based on CT image images taken, with a generator, producing an artificial CT image that includes the CT image, and with a discriminator, distinguishing a real CT image from the artificial CT image, according to the methods of the present specification described herein. The executable code may perform other functions described herein.

In the course of executing code, the processor (501) may receive input from and provide output to a number of the remaining hardware units. The data storage device (502) may store data such as executable program code that is executed by the processor (501) or other processing device. As will be discussed, the data storage device (502) may specifically store computer code representing a number of applications that the processor (501) executes to implement at least the functionality described herein.

The data storage device (502) may include various types of memory modules, including volatile and nonvolatile memory. For example, the data storage device (502) of the present example includes Random Access Memory (RAM) (506), Read Only Memory (ROM) (507), and Hard Disk Drive (HDD) memory (508). Many other types of memory may also be utilized, and the present specification contemplates the use of many varying type(s) of memory in the data storage device (502) as may suit a particular application of the principles described herein. In certain examples, different types of memory in the data storage device (502) may be used for different data storage needs. For example, in certain examples the processor (501) may boot from Read Only Memory (ROM) (507), maintain nonvolatile storage in the Hard Disk Drive (HDD) memory (508), and execute program code stored in Random Access Memory (RAM) (506).

The data storage device (502) may include a computer readable medium, a computer readable storage medium, or a non-transitory computer readable medium, among others. For example, the data storage device (502) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (503, 504) in the computing device (500) enable the processor (501) to interface with various other hardware elements, external and internal to the computing device (500). For example, the peripheral device adapters (503) may provide an interface to input/output devices, such as, for example, the display device (509), the CT imaging device (510), a mouse, a keyboard, or other peripheral device. The peripheral device adapters (503) may also provide access to other external devices such as an external CT imaging device, an external storage device, a number of network devices such as, for example, servers, switches, and routers, client devices, other types of computing devices, and combinations thereof.

The display device (509) may be provided to allow a user of the computing device (500) to interact with and implement the functionality of the computing device (500). The peripheral device adapters (503) may also create an interface between the processor (501) and the display device (509). In one example, the display device (509) may provide a user with a visual representation of the processed image (120). The network adapter (504) may provide an interface to other computing devices within, for example, a network, thereby enabling the transmission of data between the computing device (500) and other devices located within the network including, for example, an external CT imaging device.

The computing device (500) may further include a number of modules used in the implementation of the functions of the computing device (500) and the processor (501). The various modules within the computing device (500) include executable program code that may be executed separately. In this example, the various modules may be stored as separate computer program products. In another example, the various modules within the computing device (500) may be combined within a number of computer program products; each computer program product including a number of the modules.

The computing device (500) may include a display module (110) to, when executed by the processor (501), display a processed image (120) on the display device (509) once the processing performed by the body part recognition CNN (101), the body part sequence RNN (103), the body part GAN (102), the contrast GAN (107), and the non-contrast GAN (108) has occurred or at any point during the processes performed by these elements. This allows a user to visualize what the CT image looks like during the processing of the CT images.

The CT imaging device (510) may be located within the computing device (500) as depicted in FIG. 5. In another example, the CT imaging device (510) may be separate from the computing device (500) and coupled to the computing device (500) in a network using the network adapter (504). In this example, the CT imaging device (510) may be a medical imaging device located within a hospital or other medical facility that houses the CT imaging device (510) and the computing device (500) may be coupled to the CT imaging device (510) via a network outside the room where the CT imaging device (510) is located as the CT imaging device may form a strong magnetic field around the area to be imaged.

The various databases (104, 105, 106, 109) including the database of the body part training data (104), the database of real body part images (105), the database of real contrast CT images with radiocontrast agent (106), and the database of real contrast CT images without the radiocontrast agent (109) may be coupled to the computing device (500). In another example, these databases (104, 105, 106, 109) may be internal to the computing device (500) or stored internally in the data storage device (502).

Figure 6:
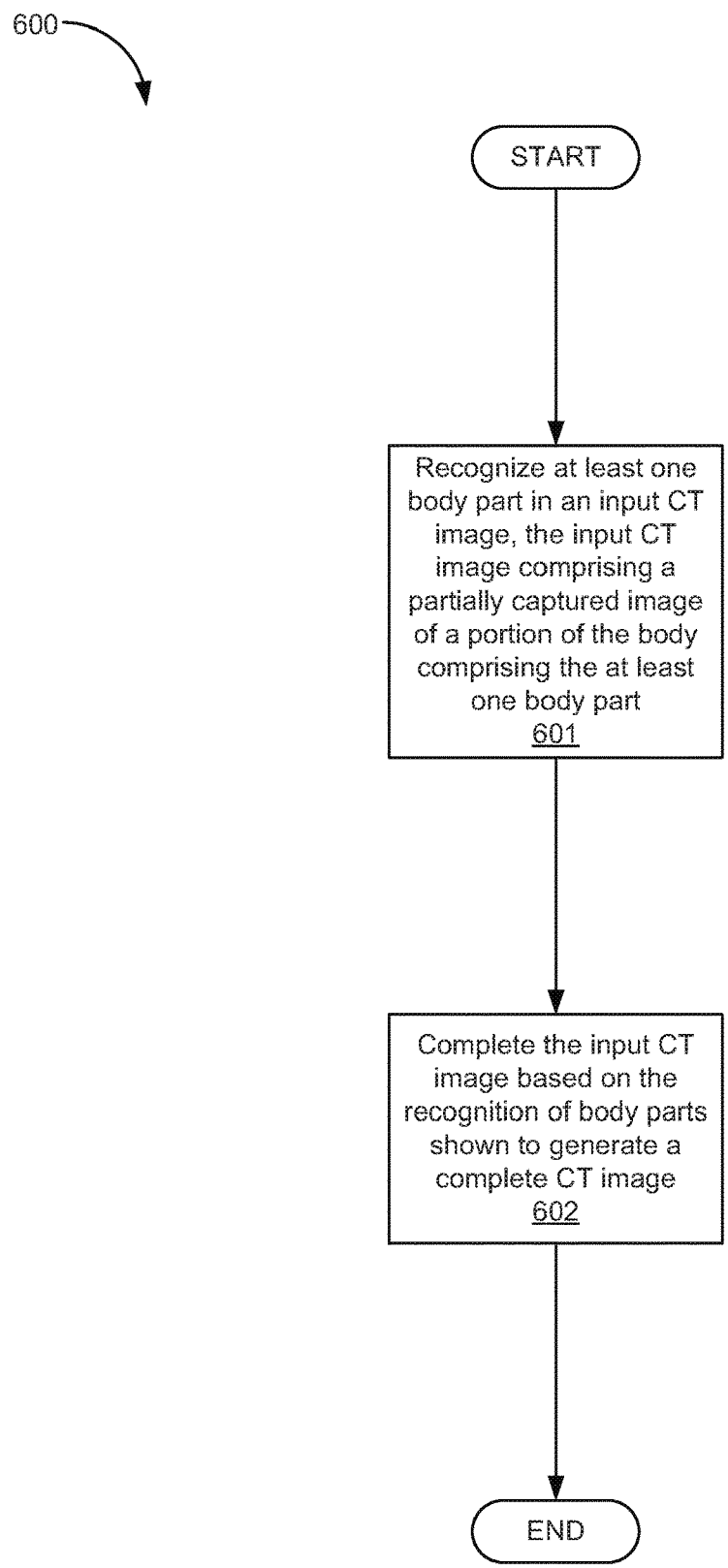
FIG. 6 is a flowchart showing a method of augmenting a computed tomography (CT) image, according to an example of the principles described herein.

FIG. 6 is a flowchart showing a method (600) of augmenting a computed tomography (CT) image, according to an example of the principles described herein. The method (600) may include recognizing (block 601) at least one body part in an input CT image (150). The recognition (block 601) may be performed using the body part recognition CNN (101) and/or the body part sequence RNN (103). The input CT image (150) may include a partially captured image of a portion of the body including the at least one body part.

The method (600) may also include completing (block 602) the input CT image (150) based on the recognition of body parts shown to generate a complete CT image. The completion (block 602) of the input CT image (150) may be performed using the body part GAN (102), the contrast GAN (107), the non-contrast GAN (108), and combinations thereof.

Figure 7:
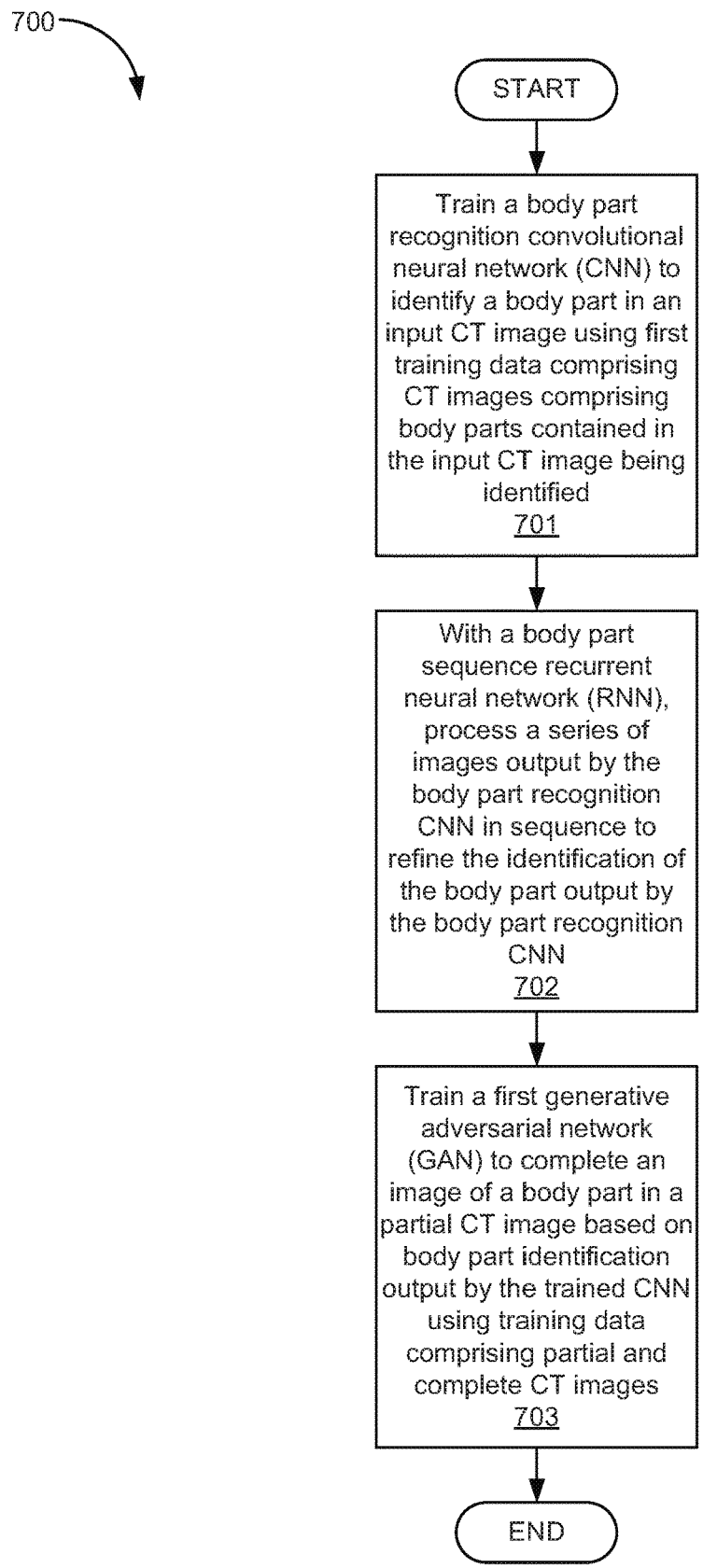
FIG. 7 is a flowchart showing a method of augmenting a computed tomography (CT) image, according to an example of the principles described herein.

FIG. 7 is a flowchart showing a method (700) of augmenting a computed tomography (CT) image (150), according to an example of the principles described herein. The method (700) of FIG. 7 may include training (block 701) the body part recognition CNN (101) to identify a body part in an input CT image using first training data (104) comprising CT images comprising body parts contained in the input CT image (150) being identified. With the body part sequence RNN (103), the method (700) may also include processing (block 702) a series of images output by the body part recognition CNN (101) in sequence to refine the identification of the body part output by the body part recognition CNN (101).

The method (700) may also include training (block 703) a first GAN (102) to complete an image of a body part in a partial CT image based on body part identification output by the trained body part recognition CNN (101) and/or the body part sequence RNN (103). The training (703) may use training data (105) comprising partial and complete CT images. The first GAN is the body part GAN (102) described herein, and the training data stored in the database of real body part images (105). The output of the method (700) is a processed image (120) that provides a user with a complete view of the CT imaged body of an individual such as a patient with the target portions of the input CT image (150) augmented with body parts obtained from other sources. This processed image (120) is obtained using fewer exposure instances to the radiography processes of medical imaging, shorter exposures to the radiography processes of medical imaging due to the imaging of a relatively smaller portion of the patient, less strain on the patient since the patient spends less time within the medical imaging device, and reduced or eliminated exposures to radiocontrast agents used in capturing the input Ct image (150).

Figure 8:
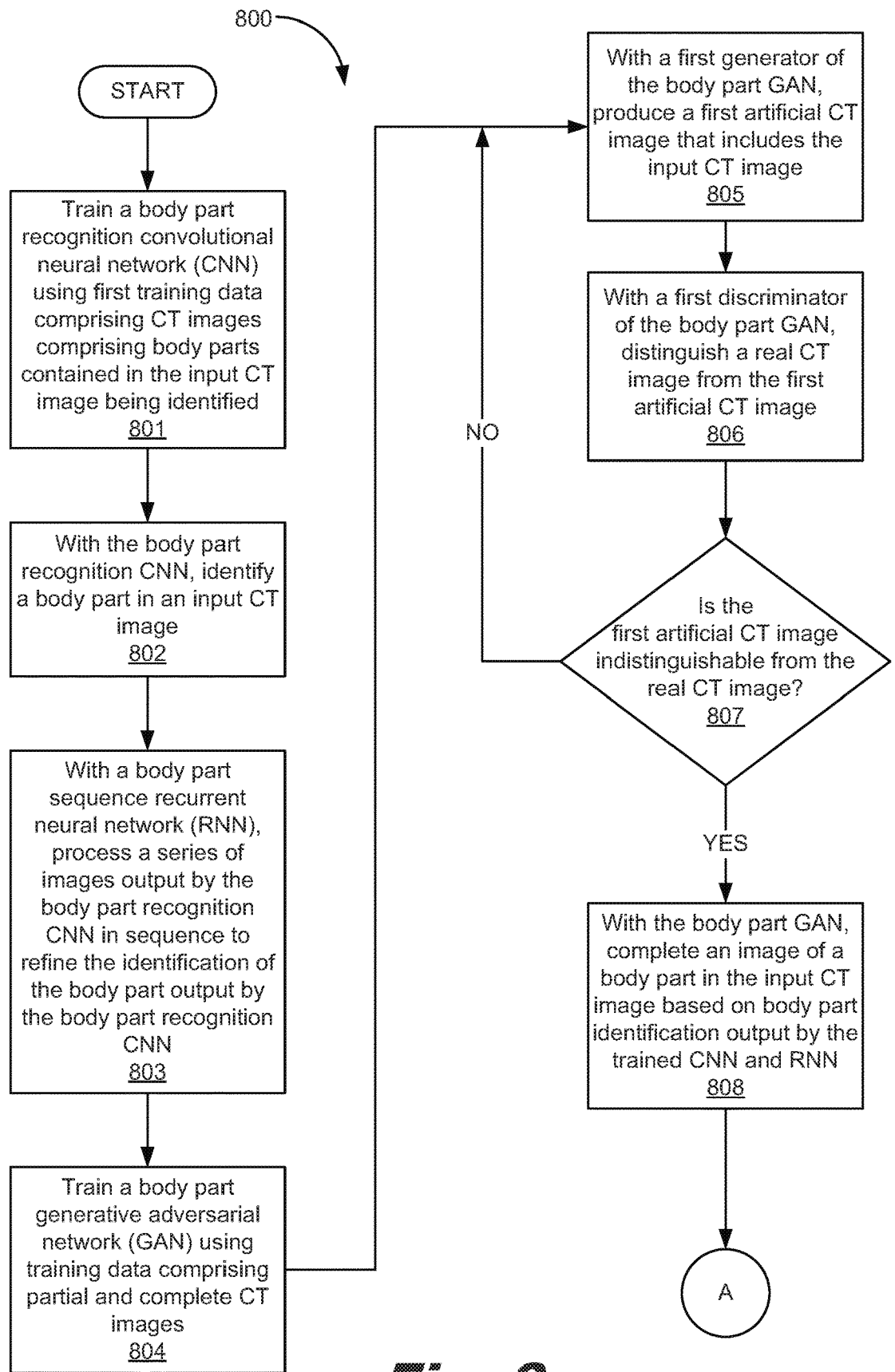
FIGS. 8 and 9 are a flowchart showing a method of augmenting a computed tomography (CT) image, according to an example of the principles described herein.
Figure 9:
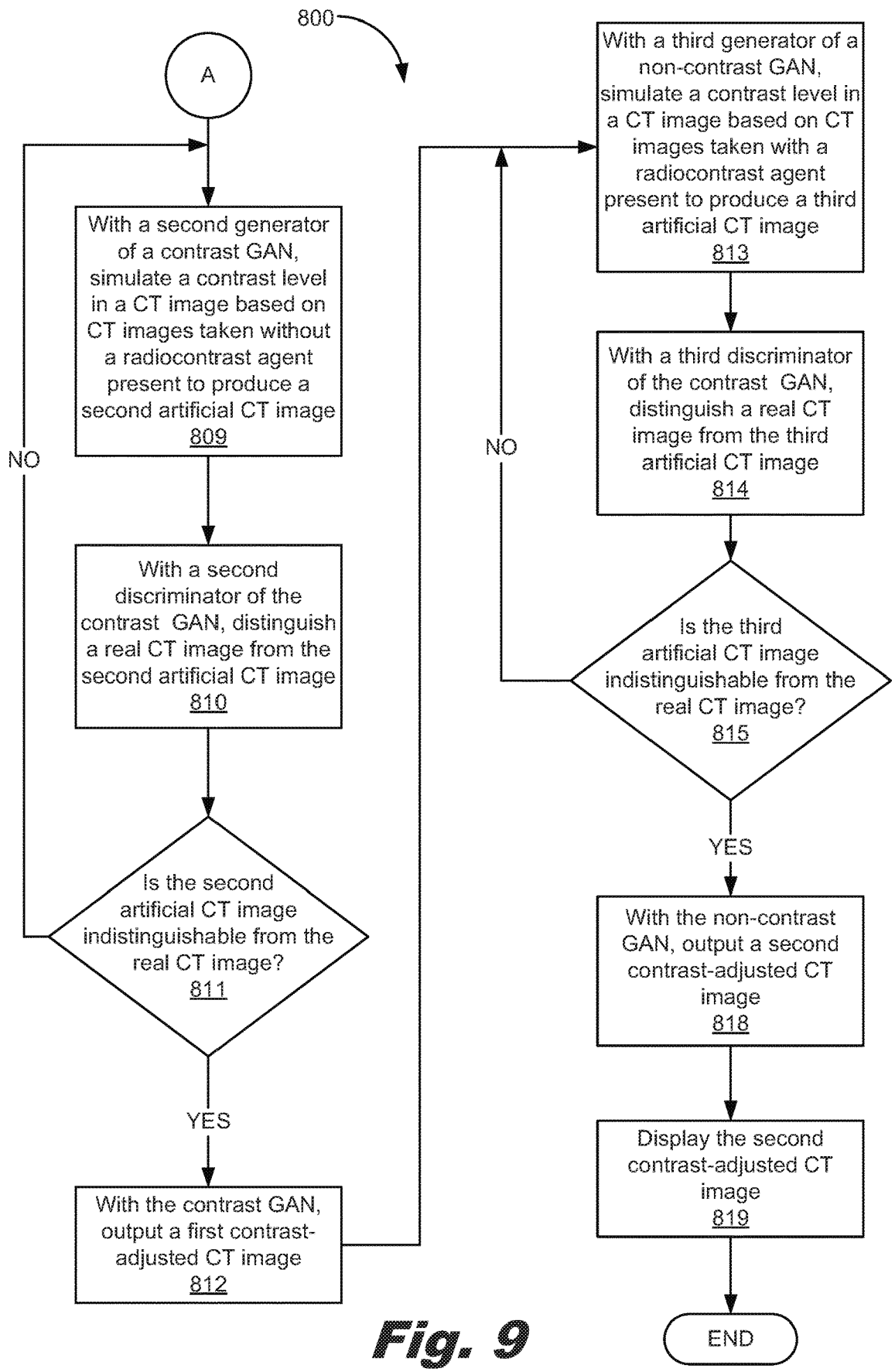

FIGS. 8 and 9 are a flowchart showing a method (800) of augmenting a computed tomography (CT) image, according to an example of the principles described herein. The method (800) of FIG. 8 may include training (block 801) the body part recognition CNN (101) using first training data (104) including CT images including body parts contained in the input CT image (150) being identified. The body part in the input CT image (150) may be identified (block 802) using the trained body part recognition CNN (101).

The method (800) may also include processing (block 803) a series of images output by the body part recognition CNN (101) in sequence with the body part sequence RNN (103) to refine the identification of the body part output by the body part recognition CNN (101). The body part recognition CNN (101) and body part sequence RNN (103) classify the body parts identified in the input CT image (150) based on, for example, the classification diagram (400) so that later devices and processes may use this identification to augment and further process the input CT image (150).

The method (800) may also include training (block 804) the body part GAN (102) using training data (105) including partial and complete CT images. The training data (105) may include data obtained from the database of real body part images (105). A first artificial CT image may be produced (block 805) using a first generator (102-1) of the body part GAN (102). The first artificial CT image may include the input CT image (150) as well as artificial portions that are filled into missing portions within the input CT image (150) or the series of input CT images that form the target body parts that the CT imaging device (510) captured of the patient.

A first discriminator (102-2) of the body part GAN (102) may be used to distinguish (block 806) a real CT image from the first artificial CT image. The first discriminator (102-2) of the body part GAN (102) may then determine (block 807) whether the first artificial CT image is indistinguishable from the real CT image. In an example, the first discriminator (102-2) may be tuned to identify differences between the first artificial CT image created by the body part GAN (102) and the real CT image obtained from, for example, the database of real body part images (105). In response to a determination that the first artificial CT image is not indistinguishable from the real CT image (block 806, determination NO) (i.e., the first discriminator (102-2) can identify the first artificial CT image as not being close enough to the real CT image), the process may loop back to the outset of block 805 where the body part GAN (102) produces a subsequent version of the first artificial CT image that is closer to the real CT image. This loop between blocks 805, 806, and 807 may be performed a number of iterations until it is determined that that the first artificial CT image is indistinguishable from the real CT image (block 806, determination YES) (i.e., the first discriminator (102-2) cannot distinguish between the first artificial CT image and the real CT image), the method (800) may include completing (block 808) the image of the body part in the input CT image (150) using the body part GAN (103) based on body part identification output by the trained body part recognition CNN (101) and the body part sequence RNN (103) and the generation and discrimination of the first artificial CT image using the first generator (102-1) and first discriminator (102-2) of the body part GAN (102).

The method (800) may also include with a second generator (107-1) of the contrast GAN (107), simulating (block 809) a contrast level in the augmented CT image output by the body part GAN (102) based on CT images taken without a radiocontrast agent present to produce a second artificial CT image. The CT images taken without a radiocontrast agent present may be stored in the database of real contrast CT images (106), and the contrast GAN (107) may access this database (106) for this purpose.

The second discriminator (107-2) of the contrast GAN (107) may be executed to distinguish (block 810) a real CT image from the second artificial CT image. The method may include determining (block 811) whether the second artificial CT image is indistinguishable from the real CT image. In an example, the second discriminator (107-2) may be tuned to identify differences between the second artificial CT image created by the contrast GAN (107) and the real CT image obtained from, for example, the database of real contrast CT images (106). In response to a determination that the second artificial CT image is not indistinguishable from the real CT image (block 811, determination NO) (i.e., the second discriminator (107-2) can identify the second artificial CT image as not being close enough to the real CT image), the process may loop hack to the outset of block 809 where the contrast GAN (107) produces a subsequent version of the second artificial CT image that is closer to the real CT image. This loop between blocks 809, 810, and 811 may be performed a number of iterations until it is determined that that the second artificial CT image is indistinguishable from the real CT image (block 811, determination YES) (i.e., the second discriminator (107-2) cannot distinguish between the second artificial CT image and the real CT image), the method (800) may include, with the contrast GAN (107), outputting (block 812) a first contrast-adjusted CT image. The first contrast-adjusted CT image is a contrast-adjusted version of the augmented CT image output by the body part GAN (102).

The first contrast-adjusted CT image output by the contrast GAN (107) is the input to the non-contrast GAN (108). The method (800) may continue by simulating (block 813) a contrast level in the first contrast-adjusted CT image with the third generator (108-1) of the non-contrast GAN (108) based on CT images taken with a radiocontrast agent present to produce a third artificial CT image. The CT images taken with a radiocontrast agent present may be stored in the database of real contrast CT images without the radiocontrast agent (109), and the non-contrast GAN (108) may access this database (109) for this purpose.

The third discriminator (108-2) of the non-contrast GAN (108) may be executed to distinguish (block 814) a real CT image from the third artificial CT image. The method may include determining (block 815) whether the third artificial CT image is indistinguishable from the real CT image. In an example, the third discriminator (108-2) may be tuned to identify differences between the third artificial CT image created by the non-contrast GAN (108) and the real CT image obtained from, for example, the database of real contrast CT images without the radiocontrast agent (109). In response to a determination that the third artificial CT image is not indistinguishable from the real CT image (block 815, determination NO) (i.e., the third discriminator (108-2) can identify the third artificial CT image as not being close enough to the real CT image), the method (800) may loop back to the outset of block 813 where the non-contrast GAN (108) produces a subsequent version of the third artificial CT image that is closer to the real CT image. This loop between blocks 813, 814, and 815 may be performed a number of iterations until it is determined that that the third artificial CT image is indistinguishable from the real CT image (block 815, determination YES) (i.e., the third discriminator (108-2) cannot distinguish between the third artificial CT image and the real CT image), the method (800) may include, with the non-contrast GAN (108), outputting (block 818) a second contrast-adjusted CT image. The second contrast-adjusted CT image is a contrast-adjusted version of the augmented CT image output by the body part GAN (102).

The method (800) may also include displaying (819) the second contrast-adjusted CT image. Display (block 819) of the second contrast-adjusted CT image may include displaying the second contrast-adjusted CT image on the display device (109). In another example, display (block 819) of the second contrast-adjusted CT image may include imaging the second contrast-adjusted CT image on photographic film. In still another example, display (block 819) of the second contrast-adjusted CT image may include rendering a 3D image on the display device (109) using a 3D rendering application executed by the computing device (500).

In the examples described herein, body part recognition performed by the body part recognition CNN (101) and/or the body part sequence RNN (103) may involve training a 3D fully convolutional network to label the body parts of all of the voxels in an image series in a single step. This may include processing the series as a 3D volume. Although this may utilize a large number of 3D volumes annotated to the voxel level, and training such a network may be computationally intensive, this 3D imaging may provide a user such as a medical practitioner with a greater understanding of the patient's situation in order to provide a more correct, informed, and effective diagnosis for the patient.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (101) of the computing device (500) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a system for generating simulated body parts for images may include a body part recognition convolutional neural network (CNN) to recognize a body part in an input image. The body part recognition CNN may be trained using first training data including training images including body parts contained in the input image being identified. The system may also include a body part generative adversarial network (GAN) to complete an image of the body part in the input image based on a body part identification output by the body part recognition CNN. The body part GAN may be trained using second training data including at least partial training images.

The systems and methods described herein provide for fewer radiation doses to a patient due to fewer CT scans being performed, a reduction or elimination of exposure to radiocontrast agent, and a reduction in the amount of the body parts scanned by filling in with generic or learned body parts in the remainder of the CT scan. This allows a medical practitioner to orient him or herself within the CT scan and allows for the CT scan to be registered all while still preserving the true data the medical practitioner is trying to study and provide a diagnosis for.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for generating simulated body parts for images, comprising:
a body part recognition convolutional neural network (CNN) to recognize a body part in an input image, the body part recognition CNN being trained using first training data comprising training images comprising body parts contained in the input image being identified;
a body part sequence recurrent neural network (RNN) to refine identification of the body part output by the body part recognition CNN by processing a series of images output by the body part recognition CNN in sequence; and
a body part generative adversarial network (GAN) to complete an image of the body part in the input image by including body parts missing from the input image based on the identification of the body part output by the body part recognition CNN, the body part GAN being trained using second training data comprising at least partial training images.

2. The system of claim 1, comprising, a contrast GAN to simulate a contrast, level, in the input, image based on contrast images.

3. The system of claim 1, wherein the input image is taken without a radiocontrast agent present.

4. The system of claim 1, comprising at least a second GAN to simulate a contrast level in an image based on images taken.

5. The system of claim 4, wherein the at least second GAN comprises:
a contrast GAN trained to simulate a contrast level in an image based on images taken without a radiocontrast agent present; and
a non-contrast GAN trained to simulate non-contrast images based on images taken with the radiocontrast agent present.

6. The system of claim 1, comprising:
a first database comprising the first training data used by the body part recognition CNN; and
a second database comprising the second training data used by the body part GAN.

7. The system of claim 5, comprising:
a third database of the images taken without the radiocontrast agent present; and
a fourth database of the images taken with the radiocontrast agent present.

8. The system of claim 5, wherein the body part GAN, the contrast GAN, and the non-contrast GAN each comprise:

a generator to produce an artificial image that includes the input image; and a discriminator to distinguish a real image from the artificial image.

9. A method of augmenting a computed tomography (CT) image comprising:

training a body part recognition convolutional neural network (CNN) to identify a body part in an input CT image using first training data comprising CT images comprising body parts contained in the input CT image being identified;

with a body part sequence recurrent neural network (RNN), processing a series of images output by the body part recognition CNN, in sequence to refine the identification of the body part output by the body part recognition CNN;

training a first generative adversarial network (GAN) to complete an image of the body part in the input CT image based on body part identification output by the trained body part recognition CNN using training data comprising partial and complete CT images.

10. The method of claim 9, wherein:

the body part recognition CNN is trained using a first database comprising the first training data; and the first GAN is trained using a second database comprising second training data.

11. The method of claim 10, further comprising training at least a second GAN to simulate a contrast level in a CT image based on CT images taken.

12. The method, of claim 11, wherein the at least second GAN comprises:

a contrast GAN trained with a third database to simulate a contrast level in the CT image based on CT images taken without a radiocontrast agent present, the third database comprising the CT images taken without the radiocontrast agent present; and a non-contrast GAN trained with a fourth database to simulate a contrast level in the CT image based on CT images taken with the radiocontrast agent present, the fourth database comprising the CT images taken with the radiocontrast agent present.

13. The method of claim 12, wherein training the body part GAN, the contrast GAN, and the non-contrast GAN comprises:

with a generator, producing an artificial CT image that includes the CT image; and with a discriminator, distinguishing a real CT image from the artificial CT image.

14. The method of claim 11, further comprising, in a partial CT image:

recognizing body parts contained in the partial CT image with the CNN and body part sequence RNN;

completing the partial CT image by filling in missing areas using the first GAN; and adjusting the contrast level of the completed CT image to an adjusted contrast leve using the at least second GAN.

15. A computer program product for augmenting a computed tomography (CT) image, the computer program product comprising:

a computer readable storage medium comprising computer usable program code embodied therewith, the computer usable program code to, when executed by a processor:

recognize, with a body part recognition convolutional, neural network (CNN) trained using first training data comprising training images with body parts contained in an input CT image being identified, at least one body part in the input CT image, the input CT image comprising a partially captured image of a portion of the body comprising the at least one body part;

refine identification of the body part output by the body part recognition CNN with a body part sequence recurrent neural network (RNN) by processing a series of images output by the body part recognition CNN in sequence; and complete the input CT image based on the recognition of body parts shown to generate a complete CT image by including, for body parts missing from the input CT image, images of body parts captured from previous patients.

16. The computer program product of claim 15, comprising computer usable program code to, when executed by the processor, simulating a desired contrast level in the completed CT image irrespective of a level of radiocontrast agent present when the partial CT image was taken.

17. The computer program product of claim 15, wherein completing the input CT image comprises executing a first generative adversarial network (GAN) trained using training data comprising partial and complete CT images.

18. The computer, program product of claim 15, comprising computer usable program code to, when executed by the processor, simulate a contrast level in a CT image based on previously captured CT images taken with and without a radiocontrast agent present.

* * * * *

UNITED STATES PATENT AND TRADEMARK OFFICE
CERTIFICATE OF CORRECTION

| | | |
|---|---|---|
| PATENT NO. | : 11,080,895 B2 | Page 1 of 1 |
| APPLICATION NO. | : 16/175592 | |
| DATED | : October 30, 2018 | |
| INVENTOR(S) | : Sun Young Park and Dustin Sargent | |

It is certified that error appears in the above-identified patent and that said Letters Patent is hereby corrected as shown below:

On the Title Page

Item (72), change inventor name from "Dusty Sargent" to "Dustin Sargent".

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*